Patented July 29, 1924.

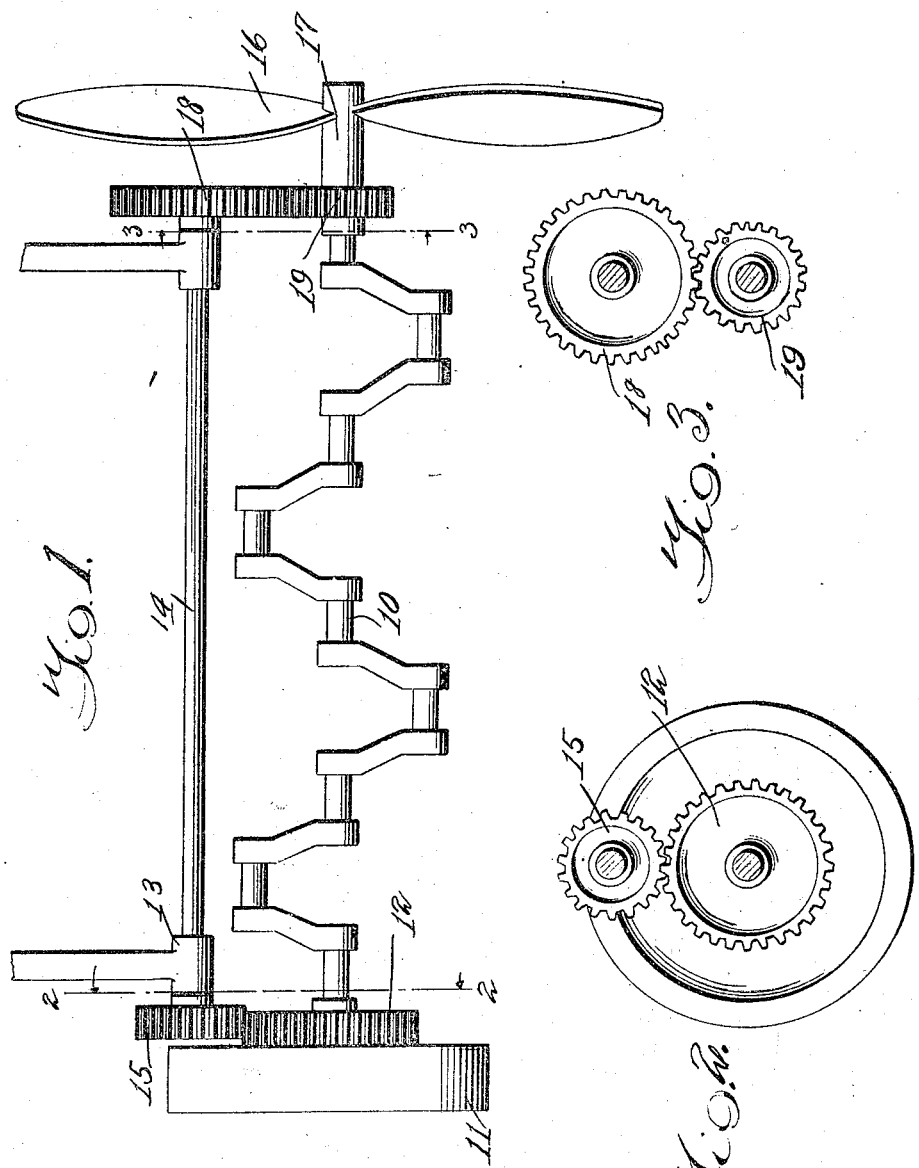

1,503,356

UNITED STATES PATENT OFFICE.

SAMUEL T. ELLIOTT, OF BIG CABIN, OKLAHOMA.

PROPELLER DRIVE.

Application filed November 11, 1922. Serial No. 600,325.

*To all whom it may concern:*

Be it known that I, SAMUEL T. ELLIOTT, a citizen of the United States, residing at Big Cabin, in the county of Craig and State of Oklahoma, have invented certain new and useful Improvements in Propeller Drives, of which the following is a specification.

This invention relates to a propeller drive and has special reference to a gearing and mounting for driving a propeller in alignment with a crank shaft.

One important object of the invention is to improve the general construction of devices of this character.

A second important object of the invention is to provide an improved and simple form of increasing the gear drive for such propellers.

With the above and other objects in view as will be hereinafter apparent, the invention consists in general of certain novel details of construction and combinations of parts hereinafter fully described, illustrated in the accompanying drawings and specifically claimed.

In the accompanying drawings, like characters of reference indicate like parts in the several views, and:—

Figure 1 is a side elevation of the improved drive.

Figure 2 is a section on the line 2—2 of Figure 1.

Figure 3 is a section on the line 3—3 of Figure 1.

In the embodiment of the invention herein disclosed there is shown a crank shaft 10 of the ordinary four crank type and on one end of this crank shaft is mounted a fly wheel 11. This crank shaft is supported in suitable bearings (not shown) and on the fly wheel end of the shaft is securely fixed a gear 12 which forms the main driving gear. Adjacent the crank shaft 12 there is provided a plurality of bearings 13 in which is mounted a jack shaft 14 which extends parallel to the axis of the crank shaft 10. One end of this shaft 14 lies opposite the fly wheel end of the shaft 10 and upon this end there is fixedly secured a gear wheel 15 which meshes with the gear wheel 12 and is driven thereby. In this manner rotation of the crank shaft imparts rotation to the shaft 14. At the other end of the shaft 10 there is provided a propeller having blades 16 and a hollow hub 17 which is fixed on the extremity of the crank shaft 10 so as to revolve freely thereon. On the shaft 14 opposite the hub 17 there is provided a third gear 18 which is fixed on the shaft 14 so as to revolve therewith. This third gear 18 meshes with a fourth gear 19 which is fixed on the hub 17. By means of the gears 18 and 19 revolution of the shaft 14 imparts revolution to the propeller and it will be noted that the propeller revolves in the same direction as the crank shaft but at a somewhat greater speed because the gears 12 and 18 are each larger than the gears 15 and 19 wherewith they mesh so that the train of gears is a speed increasing train. By reason of the mounting of the hub 17 on the crank shaft in this manner a high speed may be given the propeller without great friction loss as is the case where the propeller shaft is mounted in bearings of its own.

There has thus been provided a simple and efficient device of the kind described and for the purpose specified.

Having thus described the invention what is claimed as new, is:—

In combination, a crank shaft, a propeller having a hub rotatably mounted on said crank shaft at one end thereof, a fly wheel secured to the crank shaft at the opposite end thereof, a jack shaft rotatably supported in bearings in spaced relation to the crank shaft, gears of different ratios secured to the opposite ends of the jack shaft, a relatively large gear fixed on said crank shaft and meshing with the smallest gear secured to the jack shaft, and a relatively small gear fixed on the hub of the propeller and meshing with the largest gear secured to the jack shaft.

In testimony whereof I affix my signature in presence of two witnesses.

SAMUEL T. ELLIOTT.

Witnesses:
S. P. SMITH,
J. G. WHITAKER.